Nov. 27, 1934.  L. R. GRUSS  1,982,471
HYDROPNEUMATIC SHOCK ABSORBER FOR MOTOR VEHICLES
Filed March 21, 1932  2 Sheets-Sheet 1
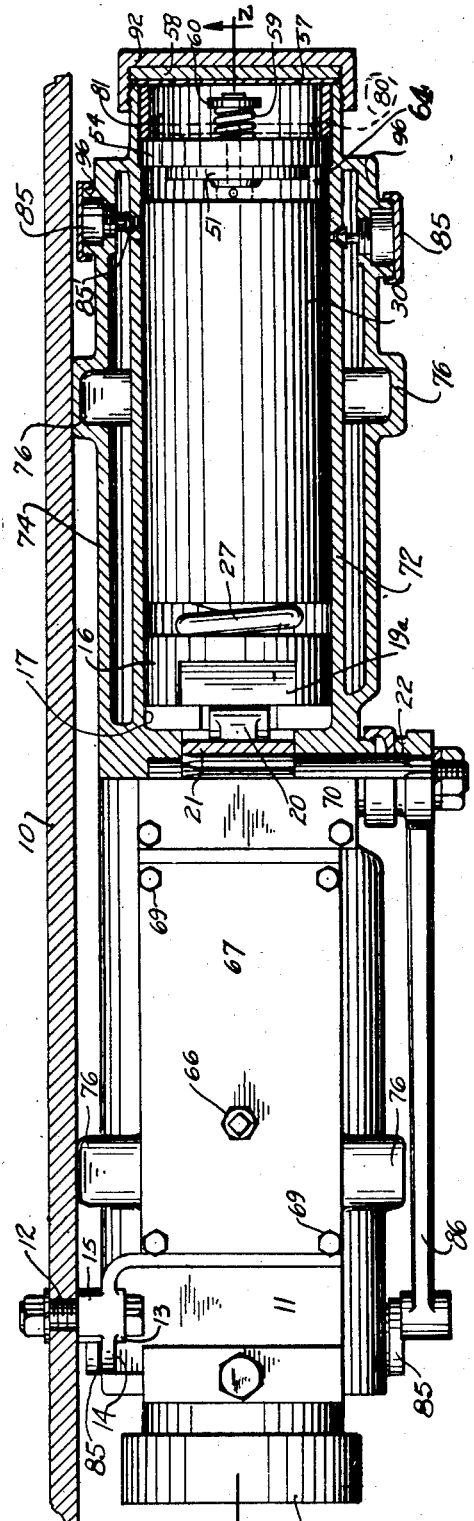
INVENTOR
LUCIEN R. GRUSS
BY
John A. Bornnhardt
ATTORNEY

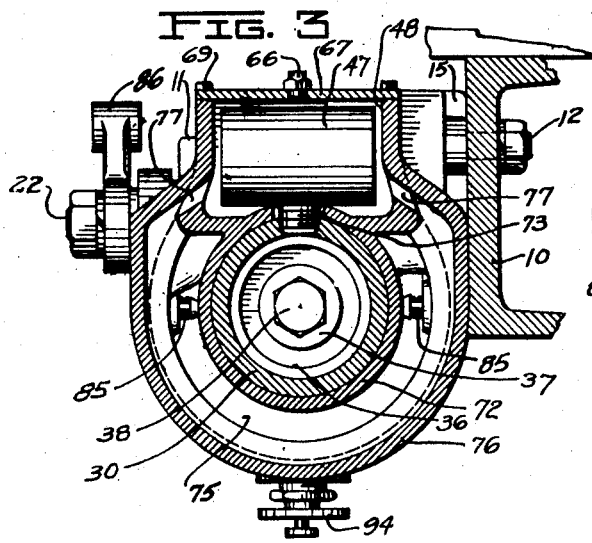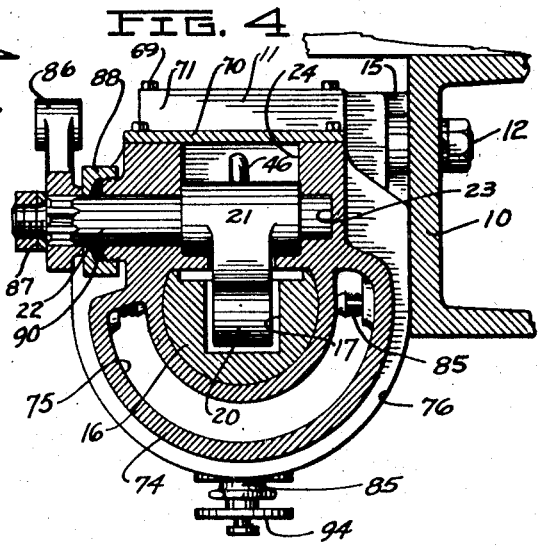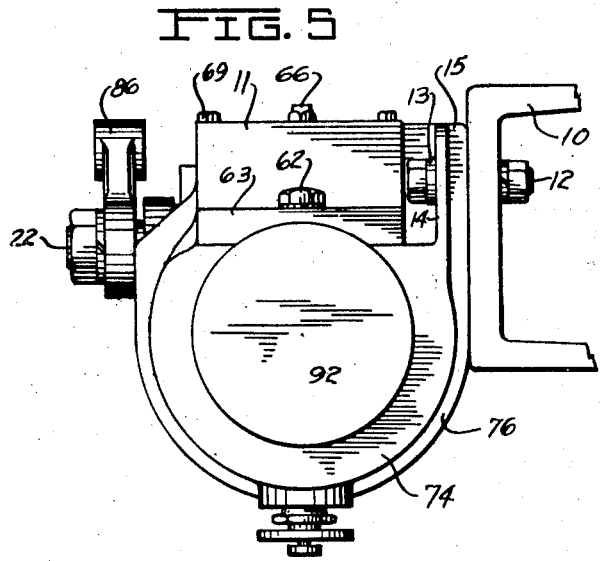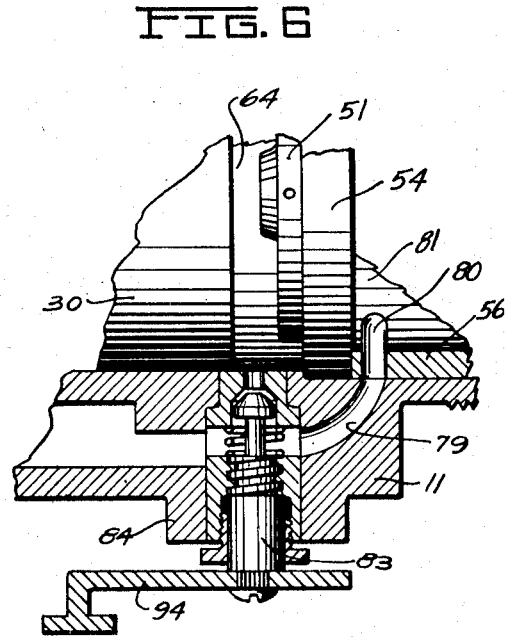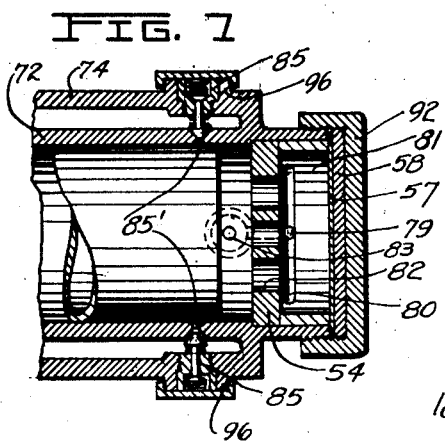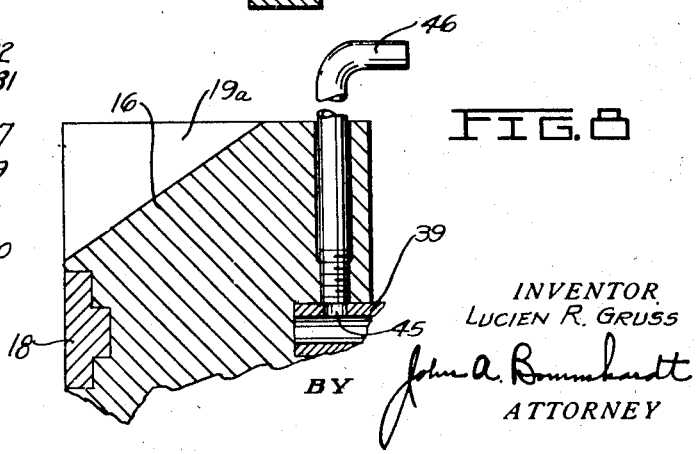

Patented Nov. 27, 1934

1,982,471

UNITED STATES PATENT OFFICE 1,982,471

HYDRO-PNEUMATIC SHOCK ABSORBER FOR MOTOR VEHICLES

Lucien R. Gruss, Cleveland, Ohio

Application March 21, 1932, Serial No. 600,208

12 Claims. (Cl. 267—8)

My invention relates to hydro-pneumatic shock absorbers for motor vehicles.

One object of the invention is to provide an improved pneumatic oil controlled air cushion to assist the vehicle springs.

Another object is to provide a control capable of raising a vehicle above its original plane of riding thereby adding greatly to the softness of the riding quality.

Other advantages may be noted from the following specification and the accompanying drawings, in which:

Figure 1 is a plan view partly in section; Fig. 2 is a longitudinal section taken on line 2—2 of Fig. 1; Fig. 3 is a transverse section taken on line 3—3 of Fig. 2; Fig. 4 is a transverse section taken on line 4—4 of Fig. 2; Fig. 5 is an end view; Fig. 6 is an enlarged fragmentary section showing the control valve; Fig. 7 is a fragmentary sectional view of a check valve and oil suction duct taken on line 7—7 of Fig. 2; Fig. 8 is a fragmentary section of the cross head showing a breather connection.

Referring specifically to the drawings, a vehicle frame is indicated at 10 to which a housing 11 is attached by bolts 12 through lugs 13 and 13a on the front of ears 14 and 14a and spacing lugs 15 and 15a, on the rear of the housing 11.

A sliding cross head 16 has a center slot 17, inset in each side of which is a bearing plate 18, and sloping grooves 19 and 19a in the top surface form a cradle in which a rocker arm 21 moves, as said rocker arm pivots on a splined shaft 22 mounted through the housing 11, and the end of said splined shaft 22 which projects through the rocker arm 21 is journaled in a bearing 23 in the housing 11, said rocker arm 21 pivoting within the recess 24 in the housing 11.

The sliding cross head 16 has at each end an extension arm or piston rod 25 with a smaller diameter threaded end 26. Around each piston rod 25 is mounted a compression spring 27 which compresses between the cross head 16 and a cylinder head 28, said cylinder head 28 being screwed in the threaded end 29 of a cylinder-piston 30, which slides in an inner cylinder 72 formed within the casing 11.

Mounted within the cylinder-piston 30 and over the piston rod 25 is a flanged leather packing 31, and a metal ring 32 with a depression 33 within which the projecting portion of the leather packing 31 is contained. The ring 32 seats against a shoulder 30' in the cylinder-piston 30.

Screwed upon the reduced threaded end 26 is a piston head 34 shouldered to form a groove 35, a cup leather 36, metal washer 37 and pipe cap 38 to retain the washer 37 in a tight position against the cup leather 36.

The projecting piston rod 25 and reduced threaded end 26 are bored lengthwise as at 39, said bore extending into the cross head 16 a short distance, and an enlarged passage 40 being cored in the piston rod 25.

Mounted and sealed tightly within the bore 39, and through the passage 40, is a hollow rod or pipe 41.

Oil is drawn into the passage 40 through oil port 42 and discharged again through oil port 42 into the outer cylinder 72 outside of the cylinder piston 30. This is to provide a means whereby an over supply of lubricating oil will be eliminated from within the said cylinder piston, while air ports 44 and 45 lead into the hollow rod or pipe 41, and an air breather tube 46 is screwed into the threaded aperture or air port 45 in the cross head 16.

A high pressure air chamber 47 is mounted within an oil chamber 48 in the casing 11 by a nipple 47', and is screwed into the top of the cylinder-piston 30, as is the air pressure regulating chamber 49, said chamber 49 being mounted above the piston head 34 by a nipple 49', the grooves 35 acting as an air conductor from an equalizing chamber 50 between the metal ring 32 and the piston head 34.

In the outer end of each cylinder 72 is a check valve head 51 mounted on a valve stem 52, with a groove or recess 53 in the surface, which head presses against the perforated metal disk 54, said disk being held rigidly in position against the shoulder 55 on the inner wall of the housing 11 by a retaining ring 56, said ring being scored on one end to press against gasket 57 between said ring 56 and a fibre washer 58. A check valve spring 59 is mounted over the valve stem 52 and is held in position next to the perforated disk 54 by a washer 60 keyed into a groove 61 in the valve stem 52.

A safety valve 62 is mounted through a boss 63 in the housing 11 and releases any air forced into a vacuum chamber 64 between the cylinder-piston 30 and the valve head 51 by by-passing the air through a passage 65. The air being lighter than the oil will form air bubbles and pass through the oil which flows into the passage 65 and rise above the oil level in the oil chamber 48 and the safety valve 62 prevents any oil escaping into the vacuum chamber 64 from the passage 65, by opening only when the air is released.

Any air in the oil chamber 48 rises above the oil and is drawn through the air breather 46 by the action of the piston into the port 45 and out through the port 44 into the cylinder-piston 30, and then into the high pressure air chamber 47 or the air pressure regulating chamber 49.

A priming plug 66 in the top of each oil chamber cover 67 facilitates the adding of oil when necessary, and said cover is bolted to flanges 68 by bolts 69, the oil chamber cover 67 being necessary as an aid to assembling the air breather 46, high pressure air chamber 47 and the air pressure regulating chamber 49.

A plate 70 is bolted within the center housing depression 71, said plate being removable to facilitate assembling of the rocker arm 21.

The top of housing 11 is a flat surface, the body of the housing forming a cylinder within a cylinder, the inner cylinder 72 being concentrically located within the outer cylinder 74 leaving a hollow oil chamber 75 as shown in Figs. 2, 3, 4 and 6. Within housing 11 and in the top surface of the cylinder 72 is a longitudinal slot 73 extending through the center of said cylinder 72 to beyond the extreme position attained by each high pressure air chamber 47 on its compression stroke.

Caps 91 and 92 at the extreme ends of the cylinder 72 are screwed on the threaded ends of said cylinder after the double cylinder-piston unit is assembled within the housing 11.

Raised hollow bands 76 partly encircle the cylindrical part 74 of the housing 11 each forming an oil by-pass through apertures 77 in the partition 78 between the inner cylinder 72 and the outer cylinder 74.

An oil suction duct 79 permits the drawing of the oil from the oil chamber 75 through the said duct 79 and the slotted aperture 80 in the retaining ring 56 and into an oil pressure chamber 81 thus formed within the retaining ring 56. The oil pressure attained by this suction forces the oil through the apertures 82 in the perforated disk 54, into the groove 53 in the valve head 51, thus forcing the head from its seat and opening the valve, the oil returning, when the cylinder piston moves toward the end of the casing, through the safety valve 83 mounted through a boss 84 in the cylinder 74, and the spring 59 expanding closes the oil pressure check valve.

A pair of safety valves 85 mounted through bosses 96 on opposite sides of the cylinder 74 and spaced on different centers from each other and from the upper safety valve 62, are closed or cut off at different degrees of pressure such as 500, 1000 or 1500 lbs., by the action of each piston-cylinder 30 as it covers each valve passage 85' in the inner cylinder 72, to prevent over inflation of the high pressure chamber 47.

An operating lever arm 86 is mounted on the projecting splined end of shaft 22 and is held in position by nut 87 against packing nut 88 which is screwed on the boss 89 on the housing 11. Packing 90 serves to prevent oil leakage while in operation.

In operation, the operating lever arm 86 being pivotally attached by suitable means to an axle, moves up and down with the action of the car when the shock absorber is bolted to the frame. The movement of the lever arm 86 pivots the rocker arm 21 causing the rocker arm lug 20 to thrust against bearing plate 18 thus moving the sliding cross head 16 one way, compressing the spring 27 at one side thus moving the threaded end 26 of the piston rod 25 forwardly. The piston head 34 at one end thrusting forward into the cylinder-piston 30 compresses air in the equalizing chamber 50 at the opposite end communicating with the air pressure regulating chamber 49 and forces the air into the said regulating chamber 49 upon the reverse thrust of the sliding cross head 16.

The movement of the piston heads 34 first actuates the oil in cylinder-piston 30 to compress the air in one piston-cylinder 30 and into the high pressure air chamber 47 at one side and expands it at the other, until said piston-cylinders are "picked up" and, acting on the oil in the cylinders 72 open and close the respective check valves 51 and transfer said oil with retarded or restricted movement through the valves 83, ports 77, reservoir 75 and chamber 48, thereby cushioning or absorbing the shocks. The compressed air controls and prevents shock or excessive rebound and provides a delicate or smooth action.

The breather 46 prevents a vacuum forming in the equalizing chamber 50 by conveying the air to the pressure regulating chamber 49 through the equalizing chamber, which destroys the pumping action after pressure has reached a high point. The entire working parts of this hydro-pneumatic shock absorber are immersed in oil, with the air ports controlling the action of the shock being under high pressure and creating an automatic oil seal which acts in conjunction with the cup leather packing to maintain the high pressure in the high pressure air chamber.

The adjustment of the controlling valves 83 may be automatically controlled from the dash or may be manually controlled by moving the lever 94 to change the spring tension.

I claim:

1. A hydro-pneumatic shock absorber, having a pair of concentric cylinders for oil and air and valved passages connecting said cylinders, hollow cylindrical pistons in opposed ends of the inner cylinder, the hollows of said cylindrical pistons forming oil chambers therein, piston rods with piston heads mounted thereon, actuating the oil to compress the air within the cylinders, a sliding block connected to and between said piston rods, and means actuated according to shock and rebound to reciprocate the sliding block.

2. A shock absorber as in claim 1, the hollow pistons also having external high pressure air chambers communicating therewith.

3. A shock absorber as in claim 1, the hollow cylindrical pistons also having external high pressure air chambers communicating therewith on the top near the center of the cylindrical pistons, and external air pressure regulating chambers communicating with said pistons near the inner ends thereof.

4. A shock absorber as in claim 1, the outer ends of the inner cylinder having inwardly opening check valves communicating with said passages.

5. A shock absorber as in claim 1, the inner end of each hollow cylindrical piston being provided with a movable piston head mounted on a piston rod and actuated to move within the inner end of the hollow cylindrical piston.

6. A hydro-pneumatic shock absorber, having a pair of concentric cylinders for oil and air, and passages having valves therein connecting said cylinders, hollow cylindrical pistons in opposed ends of the inner cylinder, the hollows of said cylindrical pistons forming oil chambers therein, piston rods with piston heads mounted thereon, actuating the oil to compress the air within the cylinders, a sliding block connected to and between said piston rods, means actuated according to shock and rebound to reciprocate the sliding block, a high pressure air chamber and an air pressure regulating chamber communicating with the inner end of each hollow cylindrical piston, and a breather air passage communicating with said end of each hollow cylindrical piston.

7. A shock absorber as in claim 6, the valves in the passages being adjustable to regulate the by-pass of the liquid from one cylinder to the other.

8. A hydro-pneumatic shock absorber comprising a casing having upper and lower chambers adapted to contain oil and air, a concentric inner cylinder forming a part of and within said casing, valves between said lower chamber and the outer ends of said cylinder, ports connecting the upper and lower chambers, hollow cylindrical pistons in the ends of said cylinder, the hollows of said cylindrical pistons forming oil chambers therein, piston rods with heads mounted thereon, actuating the oil to compress the air within the chambers, a sliding block between the piston rods, springs between the block and the inner ends of the hollow cylindrical pistons, intermediate heads on the piston rods between the piston head and the sliding block, and means to reciprocate the block.

9. A shock absorber as in claim 8, and air breather passages extending through the piston rods and into the inner ends of the hollow cylindrical pistons said air breather passages having openings extending into the upper part of the upper chamber.

10. A shock absorber as in claim 8, the outer ends of the cylinder having valved passages opening into the upper chamber.

11. A shock absorber as in claim 8, the wall between the upper chamber and the cylinder being slotted, and the hollow cylindrical pistons being provided with air pressure chambers movable in the upper chamber and having nipples extending through said slots and into the hollow pistons.

12. A shock absorber as in claim 8, and oil passages extending through the piston rods and into the inner ends of the hollow cylindrical pistons.

LUCIEN R. GRUSS.